(12) United States Patent
Stegmaier et al.

(10) Patent No.: US 12,333,869 B2
(45) Date of Patent: Jun. 17, 2025

(54) METHOD FOR MONITORING THE TRAVEL SPEED OF A BICYCLE

(71) Applicant: Robert Bosch GmbH, Stuttgart (DE)

(72) Inventors: Juergen Stegmaier, Wannweil (DE); Tim Dackermann, Tuebingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 324 days.

(21) Appl. No.: 17/661,040

(22) Filed: Apr. 27, 2022

(65) Prior Publication Data
US 2022/0358796 A1 Nov. 10, 2022

(30) Foreign Application Priority Data

May 4, 2021 (DE) .................... 10 2021 204 468.9

(51) Int. Cl.
*B62J 45/412* (2020.01)
*B62J 43/30* (2020.01)
*B62J 50/22* (2020.01)
*G01P 21/02* (2006.01)
*G01S 19/48* (2010.01)
*G07C 5/08* (2006.01)
*B62M 6/40* (2010.01)

(52) U.S. Cl.
CPC ............ *G07C 5/0808* (2013.01); *B62J 43/30* (2020.02); *B62J 45/412* (2020.02); *B62J 50/22* (2020.02); *G01P 21/02* (2013.01); *G01S 19/48* (2013.01); *G07C 5/0825* (2013.01); *B62M 6/40* (2013.01)

(58) Field of Classification Search
CPC ...... G07C 5/0808; G07C 5/0825; B62J 43/30; B62J 45/412; B62J 50/22; G01P 21/02; G01S 19/48; B62M 6/40
See application file for complete search history.

(56) References Cited

U.S. PATENT DOCUMENTS

| | | | | |
|---|---|---|---|---|
| 2004/0189722 A1* | 9/2004 | Acres | ................... | G01C 22/002 715/866 |
| 2005/0189157 A1* | 9/2005 | Hays | ........................ | B62M 6/55 180/206.7 |
| 2011/0079453 A1* | 4/2011 | Wanger | ................ | B62K 27/003 180/11 |

FOREIGN PATENT DOCUMENTS

| | | |
|---|---|---|
| DE | 102014212760 A1 | 3/2015 |
| DE | 102019105202 A1 | 9/2019 |
| DE | 102020122727 A1 | 3/2021 |
| EP | 1462771 A2 | 9/2004 |

* cited by examiner

*Primary Examiner* — Nga X Nguyen
(74) *Attorney, Agent, or Firm* — NORTON ROSE FULBRIGHT US LLP

(57) ABSTRACT

A method for monitoring the travel speed of a bicycle, in particular a pedelec. The method includes: providing a power supply for a speed signal transmitter, ascertaining a first speed for the bicycle, interrupting the power supply for the speed signal transmitter for a specifiable interruption time span, while the power supply is switched off, ascertaining a second speed, ascertaining a comparison result by comparing the ascertained first and second speed, and recognizing a faulty speed signal transmitter as a function of the result of the comparison.

17 Claims, 2 Drawing Sheets

METHOD FOR MONITORING THE TRAVEL SPEED OF A BICYCLE

CROSS REFERENCE

The present application claims the benefit under 35 U.S.C. § 119 of German Patent Application No. DE 10 2021 204 468.9 filed on May 4, 2021, which is expressly incorporated herein by reference in its entirety.

FIELD

The present invention relates to a method for monitoring the travel speed of a bicycle, in particular a pedelec.

In addition, the present invention relates to a device for monitoring the travel speed of a bicycle, in particular a pedelec.

In addition, the present invention relates to a bicycle.

BACKGROUND INFORMATION

Although the present invention is generally applicable to any bicycle, the present invention is described in relation to bicycles in the form of pedelecs.

Pedelecs make use of motorized support up to a maximum speed of 25 km/h. In order to maintain this boundary value, a speed measurement takes place in the pedelec. In a conventional manner, the speed measurement can take place using a magnet situated on the rear wheel, in combination with a reed sensor situated on the frame of the pedelec. The speed is then calculated from the mathematical relation between the time interval between two successive reed impulses and the tire circumference, programmed into the pedal system.

A problem here is that the motorized support has to be shut off when the speed can no longer be reliably ascertained, for example when the reed sensor is defective and provides a speed signal that implies a speed differing from the real travel speed of the pedelec. Motorized support at travel speeds greater than 25 km/h may cause overheating of the drive and of the power supply, or may cause breakage in mechanical drive components.

SUMMARY

In a specific embodiment, the present invention provides a method for monitoring the travel speed of a bicycle, in particular a pedelec, including the steps:
  providing a power supply for a speed signal transmitter,
  ascertaining a first speed for the bicycle,
  interrupting the power supply for the speed signal transmitter for a specifiable interruption time span,
  while the power supply is switched off, ascertaining a second speed,
  ascertaining a comparison result by comparing the ascertained first and second speed, and
  recognizing a faulty speed signal transmitter as a function of the result of the comparison.

In a further specific embodiment, the present invention provides a device for monitoring the travel speed of a bicycle, in particular a pedelec, including:
  a speed signal transmitter,
  a power supply device for supplying power for the speed signal transmitter,
  a measurement device designed to ascertain a speed of the bicycle,
  a monitoring device that is designed to interrupt the power supply to the speed signal transmitter for a specifiable interruption time span, and, while the power supply to the speed signal transmitter is switched off, to control the measurement device so as to ascertain a second speed, and subsequently to ascertain a comparison result by comparing the ascertained first and second speed, and to recognize a faulty speed signal transmitter as a function of the result of the comparison. In a further specific embodiment, the present invention provides a bicycle having the disclosed device.

One of the advantages thereby achieved is that a defective speed signal transmitter can be ascertained in an easy and extremely reliable manner. A further advantage is that the lifespan of components of the bicycle is increased, because it is ensured that these components are operated only within their specifications and are not overloaded due to excessive speed support.

Further features, advantages, and specific embodiments of the present invention are described in the following, or are disclosed thereby.

According to an advantageous development of the present invention, the power supply is interrupted at regular time intervals. One of the advantages thereby enabled is that a regular monitoring of the first speed sensor is enabled.

According to a further advantageous development of the present invention, the power supply is interrupted in an event-based fashion. One of the advantages thereby enabled is that in this way the proper functioning of the first speed sensor can be monitored in a flexible manner, for example when a measured acceleration exceeds a specified boundary value.

According to a further advantageous development of the present invention, the ascertaining of the first speed takes place on the basis of a signal of the speed signal transmitter and/or the ascertaining of the second speed takes place on the basis of a speed sensor. An advantage of this is that the first and second speed can be ascertained in a reliable manner.

According to a further advantageous development of the present invention, the interruption time span is defined differently for at least two interruptions, in particular such that for each interruption of the power supply a different interruption time span is defined, in particular is selected randomly from a specified time interval. One of the advantages thereby achieved is that in this way the proper functioning is monitored independently of specified times or events.

According to a further advantageous development of the present invention, the proper functioning of the speed signal transmitter is monitored using a further monitoring method, a recognition of a faulty speed signal transmitter taking place as a function of the result of the comparison and a result of the further test method. In this way, the reliability of the monitoring of the result and of the monitoring of the speed signal transmitter is further improved.

According to a further advantageous development of the present invention, the speed signal transmitter is realized in pulse-based fashion, and the interruption of the power supply for the speed signal transmitter takes place whenever a pulse of the speed signal transmitter is expected. In this way, the reliability of the monitoring of the function of the speed signal transmitter can be further increased.

According to a further advantageous development of the present invention, in each case when a faulty speed signal transmitter is recognized the event is counted within a specifiable time span and is compared with at least one count threshold value, and an action is not initiated until the specified count threshold value is exceeded, preferably the count threshold value having the value 3. In this way, the reliability of the monitoring of the function of the speed signal transmitter and the recognition of a faulty speed signal transmitter can be further increased. The term "action" is to be understood in the broadest sense, and, relates to any type of measure, process, activity, or act that here is initiated or carried out after the recognition of a faulty speed signal transmitter. As count threshold value, for example the value 2, 4, 5, 10, or the like may also be used.

According to a further advantageous development of the present invention, the action takes place in the form of
- an in particular time-offset switching off of at least one drive device of the bicycle, in particular of the bicycle system of the bicycle, and/or
- a display, in particular a visual display for a user of the bicycle, and/or
- a message of a diagnostic system of the bicycle, and/or
- a changeover to a speed signal, alternative to the speed signal transmitter, in order to ascertain the speed of the bicycle, in particular GPS.

In this way, in a flexible manner it is possible to take into account a faulty speed signal transmitter, for example by switching off the entire bicycle system, including all of the support components, such as the drive, ABS, light, or the like. Here, the switching off can take place in time-offset fashion or with a delay, so that the user of the bicycle can bring the bicycle to a standstill before switching off one or all of the support components.

According to a further advantageous development of the present invention, the comparison of the ascertained first and second speed is done through difference formation between the first and second speed, and on the basis of the differences it is ascertained whether there is a jump between the respective speeds. An advantage of this is a particularly simple method for comparing the speeds.

According to a further advantageous development of the present invention, there is a jump when a magnitude of the respective difference is greater than a specifiable value, in particular when the value is 5 km/h, and/or when one of the two speeds is 0 km/h. An advantage of this is a simple and rapid calculation, as well as accuracy adequate for recognizing a faulty speed signal transmitter.

According to a further advantageous development of the present invention, the specifiable value is defined as a function of at least one of the ascertained speeds. In this way, for example a percent determination can take place, so that the same relative deviation is always assumed as the measurement inaccuracy of the speed signal transmitter. An advantage of this is a more reliable monitoring of the speed signal transmitter.

According to a further advantageous development of the present invention, there takes place an ascertaining of a third speed, in particular by the speed signal transmitter, and the ascertaining of a comparison result by comparing the ascertained first, second, and third speed. An advantage of this is a still more reliable comparison result for monitoring the speed signal transmitter as to whether it is faulty or not.

Further features and advantages of the present invention result from the disclosure herein.

It will be understood that the features named above and explained below may be used not only in the respectively indicated combination, but also in other combinations or by themselves, without departing from the scope of the present invention.

Preferred embodiments and specific embodiments of the present invention are shown in the figures and are explained in more detail in the following description, in which identical reference characters relate to identical or similar or functionally identical components or elements.

DETAILED DESCRIPTION OF EXAMPLE EMBODIMENTS

Figure 1:
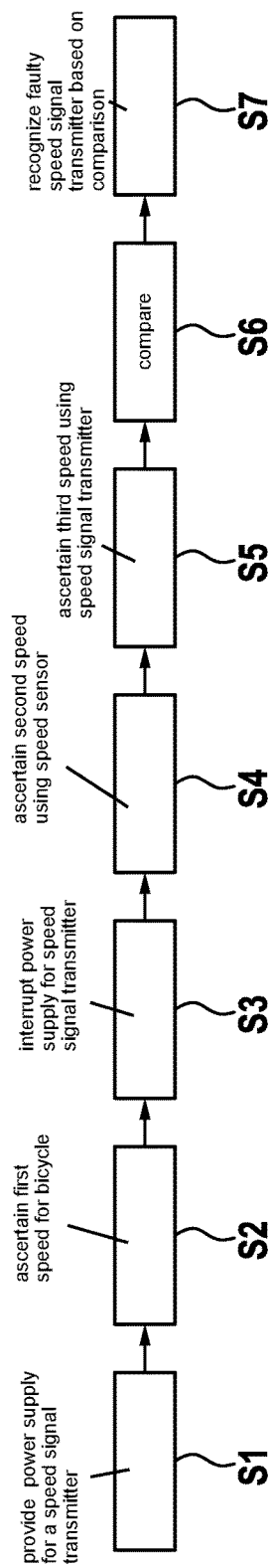
FIG. 1 shows steps of a method according to a specific example embodiment of the present invention.

FIG. 1 shows steps of a method according to a specific example embodiment of the present invention.

In detail, FIG. 1 shows steps of a method for monitoring the travel speed of a bicycle, in particular a pedelec. The method includes the following steps:
providing S1 a power supply for a speed signal transmitter 2,
ascertaining S2 a first speed for the bicycle on the basis of a signal of speed signal transmitter 2,
interrupting S3 the power supply for speed signal transmitter 2 for a specifiable interruption time span,
while the power supply is switched off, ascertaining S4 a second speed using a speed sensor 3,
ascertaining S5 a third speed using speed signal transmitter 2,
ascertaining S6 a comparison result by comparing the ascertained first, second, and third speed, and
recognizing S7 a faulty speed signal transmitter 2 as a function of the result of the comparison.

Figure 2:
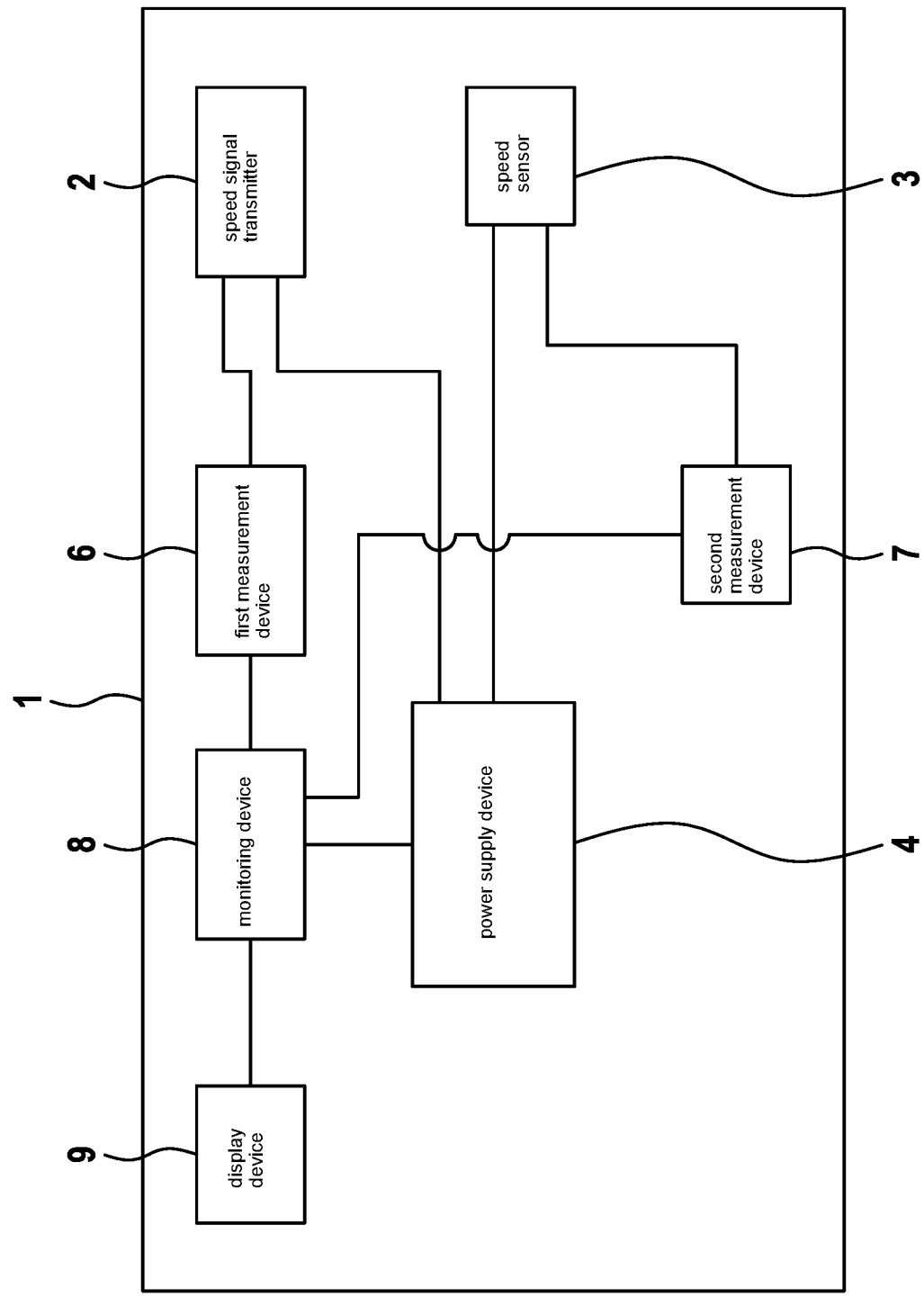
FIG. 2 shows a device according to a specific example embodiment of the present invention.

FIG. 2 shows a device according to a specific embodiment of the present invention.

In detail, FIG. 2 shows a device 1 for monitoring the travel speed of a bicycle, in particular a pedelec. Device 1 includes a speed signal transmitter 2 and a speed sensor 3. In particular, speed signal transmitter 2 is realized as a reed sensor, and provides pulse-based signals whenever a magnet on the rim of a wheel of the bicycle passes the reed sensor.

In addition, a power supply device 4 is provided that is connected to speed signal transmitter 2 for power supply. Power supply device 4 can be realized for example in the form of a battery or the like in order to provide electrical energy. Power supply device 4 can not only supply speed signal transmitter 2 with energy, but can also provide energy to further components of the bicycle.

Using a first measurement device 6 that is connected to speed signal transmitter 2, a first and in particular also a third speed of the bicycle are ascertained on the basis of measurements of speed signal transmitter 2. The measurements for the first and in particular third speed are made here with a temporal interval between them. Using a second measurement device 7 that is connected to speed signal transmitter 3, a second speed is ascertained for the bicycle, for example on the basis of measurements of speed sensor 3. The measurement of the second speed here takes place temporally after the measurement of the first speed and in particular before the measurement of the third speed. However, measurement devices 6, 7 can also be realized in a single measurement device, so that the measurement device ascertains the first, second, and third speed.

In order to monitor the proper functioning of speed signal transmitter 2, in addition a monitoring device 8 is provided that is designed to control power supply device 4 in such a way that the power supply device interrupts the supply of power to speed signal transmitter 2 for a specifiable interruption time span, for example by correspondingly switching off the electrical voltage supply. While the power supply for speed signal transmitter 2 is shut off, monitoring device 8 controls second measurement device 7 in such a way that this measurement device ascertains the second speed, in particular using speed sensor 3. Monitoring device 8 subsequently ascertains a comparison result by comparing the ascertained first, second, and in particular third speed. On the basis of the comparison, monitoring device 8 then determines whether and, if appropriate, to what extent speed signal transmitter 2 is faulty. For example, if there result a plurality of jumps in temporally spaced measurements between the first and second speed, as well as in particular between the second and third speed, then it is determined that speed signal transmitter 2 is not operating properly. A corresponding result can then be displayed to a user of the bicycle on a display device 9.

The interruption of the power supply can take place cyclically or regularly, for example every five minutes, and/or in an event-based fashion, for example when a measured acceleration is greater than a particular boundary value. This has the advantage that the speed jump described above is made particularly clear.

In addition, the present monitoring method according to specific embodiments of the present invention can be combined with other monitoring methods, which has the advantage of reducing the probability of false positive decisions relating to a faulty speed signal transmitter. In a further specific embodiment, the power supply can be interrupted deliberately at the moment at which a reed impulse is expected, the corresponding time being predictable for example by an estimator.

In a further specific embodiment, through repeated interruption of the power supply and counting of the speed jumps in a time interval, or for a complete trip or for the complete run time of a motor, the decision as to whether the speed signal transmitter is operating properly can be made still more robust. Thus, a determination that the speed signal transmitter is operating incorrectly may not take place until for example a faulty speed sensor has been recognized three times in a specified time interval, based on the respective comparison results.

In sum, at least one of the specific embodiments of the present invention has at least one of the following advantages and/or provides at least one of the following features:
  simple and extremely reliable recognition of a faulty speed signal transmitter;
  increase of the lifespan of components of the bicycle.

Although the present invention has been described on the basis of preferred exemplary embodiments, it is not limited thereto, but rather can be modified in various ways.

What is claimed is:

1. A method for monitoring the travel speed of a bicycle, comprising the following steps:
  in a sensor-power-supply period, providing a power supply for a first speed sensor that, when powered, transmits sensor signals in response to sensor trigger events;
  ascertaining a first speed for the bicycle based on the sensor signals transmitted in the sensor-power-supply period;
  in a first instance of a sensor-power-suppression period that immediately follows the sensor-power-supply period:
    interrupting the power supply for the first speed sensor, thereby preventing transmission of additional sensor signals by the first speed sensor for an entirety of the first instance of the sensor-power-suppression period, which has a first predefined interruption time duration; and
    ascertaining a second speed using a second speed sensor,
  ascertaining a comparison result by comparing the ascertained first speed and the ascertained second speed; and
  recognizing the first speed sensor as faulty as a function of the comparison result.

2. The method as recited in claim 1, wherein the bicycle is a pedelec.

3. The method as recited in claim 1, wherein the interrupting is performed at regular time intervals.

4. The method as recited in claim 1, wherein the sensor-power-suppression period is applied multiple times to provide for at least two interruptions, the first instance being a first one of the applications of the sensor-power-suppression period, and wherein a second instance of the sensor-power-suppression period has a second predefined interruption time duration, the first and second time durations being selected randomly for the first and second instances of the sensor-power-suppression period.

5. The method as recited in claim 1, wherein the first speed sensor is monitored, by a further monitoring method, for proper functioning, a recognition of the first speed sensor as faulty taking place as a function of the comparison result and a result of the further test method.

6. The method as recited in claim 1, wherein the first speed sensor is pulse-based, and the interruption takes place during a time period when a pulse of the first speed sensor is expected.

7. The method as recited in claim 1, wherein, in each case that the first speed sensor is recognized as faulty, an event counter is increased from a prior value of the counter without restarting the counter on condition that the respective case occurs within a specifiable time span from an immediately preceding one of the cases, and the counter value is compared with a predefined count threshold value, and an action is initiated in response to a result of the counter value comparison being that the predefined count threshold value is exceeded.

8. The method as recited in claim 7, wherein the action is:
  a time-offset switching off of at least one drive device of the bicycle, and/or
  a visual display for a user of the bicycle, and/or
  a message of a diagnostic system of the bicycle, and/or
  a changeover to a speed signal alternative to the first speed sensor for ascertaining the speed of the bicycle, the speed signal alternative being GPS.

9. The method as recited in claim 1, wherein the comparing of the ascertained first speed and the ascertained second speed takes place by difference formation between the ascertained first speed and the ascertained second speed, and whether there is a jump between the respective speeds is ascertained based on the difference.

10. The method as recited in claim 9, wherein the jump is present when a magnitude of the difference is greater than a specifiable value, and/or when one of the ascertained first speed and the ascertained second speed is 0 km/h.

11. The method as recited in claim 10, wherein the value is 5 km/h.

12. The method as recited in claim 10, wherein the specifiable value is defined as a function of at least one of the ascertained first and second speeds.

13. The method as recited in claim 1, further comprising:

subsequent to the first instance of a sensor-power-suppression period, ascertaining a third speed based on signals from the first speed sensor; and wherein the ascertaining of the comparison result takes place through comparison of the ascertained first, second, and third speeds.

14. A device configured to monitor a travel speed of a bicycle, the bicycle being a pedelec, the device comprising:

a first speed sensor;

a second speed sensor;

a power supply device; and a processor system that includes at least one processor, wherein the processor system is configured to:

in a sensor-power-supply period, use the power supply device to provide a power supply for the first speed sensor that, when powered, transmits sensor signals in response to sensor trigger events;

ascertain a first speed for the bicycle based on the sensor signals transmitted in the sensor-power-supply period;

in a first instance of a sensor-power-suppression period that immediately follows the sensor-power-supply period:

interrupt the power supply for the first speed sensor, thereby preventing transmission of additional sensor signals by the first speed sensor for an entirety of the first instance of the sensor-power-suppression period, which has a first predefined interruption time duration; and ascertain a second speed using the second speed sensor;

ascertain a comparison result by comparing the ascertained first speed and the ascertained second speed; and recognize the first speed sensor as faulty as a function of the comparison result.

15. A bicycle comprising:

a device configured to monitor a travel speed of the bicycle, the bicycle being a pedelec, the device including:

a first speed sensor;

a second speed sensor;

a power supply device; and a processor system that includes at least one processor, wherein the processor system is configured to:

in a sensor-power-supply period, use the power supply device to provide a power supply for the first speed sensor that, when powered, transmits sensor signals in response to sensor trigger events;

ascertain a first speed for the bicycle based on the sensor signals transmitted in the sensor-power-supply period;

in a first instance of a sensor-power-suppression period that immediately follows the sensor-power-supply period:

interrupt the power supply for the first speed sensor, thereby preventing transmission of additional sensor signals by the first speed sensor for an entirety of the first instance of the sensor-power-suppression period, which has a first predefined interruption time duration; and ascertain a second speed using the second speed sensor;

ascertain a comparison result by comparing the ascertained first speed and the ascertained second speed; and recognize the first speed sensor as faulty as a function of the comparison result.

16. The method as recited in claim 1, wherein the interrupting is performed in an event-based fashion.

17. The method as recited in claim 7, wherein the count threshold value is 3.

* * * * *